United States Patent
Yoon et al.

(10) Patent No.: US 12,484,007 B2
(45) Date of Patent: Nov. 25, 2025

(54) METHOD AND APPARATUS FOR PROCESSING EVENT FOR DEVICE CHANGE

(71) Applicant: Samsung Electronics Co., Ltd., Suwon-si (KR)

(72) Inventors: Kangjin Yoon, Suwon-si (KR); Sujung Kang, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 18/161,359

(22) Filed: Jan. 30, 2023

(65) Prior Publication Data

US 2023/0247578 A1     Aug. 3, 2023

(30) Foreign Application Priority Data

Jan. 28, 2022   (KR) .................. 10-2022-0013327

(51) Int. Cl.
*H04W 8/20* (2009.01)
*H04W 60/04* (2009.01)

(52) U.S. Cl.
CPC ............. *H04W 60/04* (2013.01); *H04W 8/20* (2013.01)

(58) Field of Classification Search
CPC ......... H04W 60/04; H04W 8/20; H04W 8/18; H04W 8/183; H04W 8/205; H04W 4/60
See application file for complete search history.

(56) References Cited

U.S. PATENT DOCUMENTS

| | | | |
|---|---|---|---|
| 10,187,784 B1 | 1/2019 | Chen et al. | |
| 10,848,589 B2 | 11/2020 | Park et al. | |
| 2016/0301529 A1* | 10/2016 | Park | H04W 8/205 |
| 2018/0191560 A1 | 7/2018 | Kovacevic et al. | |
| 2019/0075453 A1* | 3/2019 | Yoon | H04W 12/35 |
| 2020/0228969 A1* | 7/2020 | Shin | H04W 12/06 |
| 2020/0236532 A1 | 7/2020 | Rajadurai et al. | |
| 2020/0389785 A1* | 12/2020 | Lee | H04W 12/40 |
| 2020/0404501 A1* | 12/2020 | Kang | H04W 8/205 |
| 2023/0308861 A1* | 9/2023 | Fan | H04W 8/205 |

FOREIGN PATENT DOCUMENTS

| | | |
|---|---|---|
| CN | 108781358 B | 2/2021 |
| EP | 3 890 378 A1 | 10/2021 |
| KR | 10-2020-0042487 A | 4/2020 |

(Continued)

OTHER PUBLICATIONS

Lee Hyewon et al., "eUICC Apparatus and Method for Changing eUICC Devices", espacenet, Sep. 23, 2020, English translated description—KR20200110101A_English_Translated_Description. pdf (Year: 2020).*

(Continued)

*Primary Examiner* — Wesley L Kim
*Assistant Examiner* — Erkin Abdullaev
(74) *Attorney, Agent, or Firm* — Jefferson IP Law, LLP

(57) ABSTRACT

The disclosure relates to a 5G or 6G communication system for supporting a higher data transmission rate. The 5G or 6G communication system is directed to a method and an apparatus for installing a profile again when changing an embedded universal integrated circuit card (eUICC) terminal.

14 Claims, 7 Drawing Sheets

(56) References Cited

FOREIGN PATENT DOCUMENTS

KR         20200110101 A * 9/2020 ............ H04W 8/205
WO    WO-2019050325 A1 * 3/2019 ............ H04W 8/205

OTHER PUBLICATIONS

Lee Hyewon et al., "eUICC Apparatus and Method for Changing eUICC Devices", espacenet, Sep. 23, 2020, Abtract in English—KR_20200110101_A_Abtract_English (Year: 2020).*
Lee Hyewon. "Apparatus and Method for Changing EUICC Devices." English Translated (Year: 2020).*
International Search Report dated Apr. 11, 2023, issued in International Patent Application No. PCT/KR2023/001327.
GSMA V2.3, Official Document SGP.22—RSP Technical Specification, Jun. 30, 2021, pp. 1-274, XP055949222.
Extended European Search Report dated Mar. 27, 2025, issued in European Patent Application No. 23747405.1.

* cited by examiner

METHOD AND APPARATUS FOR PROCESSING EVENT FOR DEVICE CHANGE

CROSS-REFERENCE TO RELATED APPLICATION(S)

This application is based on and claims priority under 35 U.S.C. § 119(a) of a Korean patent application number 10-2022-0013327, filed on Jan. 28, 2022, in the Korean Intellectual Property Office, the disclosure of which is incorporated by reference herein in its entirety.

BACKGROUND

1. Field

The disclosure relates to a method and an apparatus for installing and managing an embedded universal integrated circuit card (eUICC) profile.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With development of a mobile communication system, various services can be provided, and a method for effectively providing such services is required.

A universal integrated circuit card (UICC), which is also called a UICC card, is a smart card used by being inserted into a mobile communication terminal. The UICC may include an access control module for accessing a network of a mobile communication business operator. Examples of the access control module include a universal subscriber identity module (USIM), a subscriber identity module (SIM), an IP multimedia service identity module (ISIM), and the like. A UICC including the USIM is commonly called a USIM card. Likewise, in general, a UICC including the SIM module is also called a SIM card.

Among the UICC cards, the UICC used as being fixed in a terminal is referred to as an embedded UICC (eUICC), and generally, the eUICC is fixed to the terminal, and means a UICC card capable of remotely downloading and selecting a SIM module. In addition, downloaded SIM module information is collectively referred to as an eUICC profile, or more simply, a profile The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide effective services in a mobile communication system.

Another aspect of the disclosure is to provide a method and an apparatus for selecting a communication service and establishing a connection to a network by a terminal in a communication system.

Another aspect of the disclosure is to provide a method and an apparatus for downloading, via online, a profile for connection to a network, and installing and managing the same by a terminal in a communication system.

Another aspect of the disclosure is to provide a method and an apparatus for allowing a profile installed for connection to a network to be efficiently downloaded again to another terminal by a terminal in a communication system.

Additional aspects will be set forth in part in the description which follows and, in part, will be apparent from the description, or may be learned by practice of the presented embodiments.

In accordance with an aspect of the disclosure, a method performed by a first server in a wireless communication system is provided. The method includes receiving a first message comprising an event registration request for a second profile corresponding to a first profile from a second server in case that the second server receives, from a first terminal, a request for transfer of the first profile to a second terminal, wherein the second server being for providing a profile, and transmitting a second message comprising an event registration result according to the event registration request to the second server, the event registration result comprising information on whether an event is forwardable.

In accordance with another aspect of the disclosure, a method performed by a second server for providing a profile in a wireless communication system is provided. The method includes receiving, from a first terminal, a second message for requesting transfer of a first profile installed in the first terminal to a second terminal in case that the first terminal receives, from the second terminal, a first message comprising at least one of an eUICC identifier (ID) installed in the second terminal, a type allocation code (TAC) of the second terminal, information on an opening mediation server supported by the second terminal, and an indicator indicating whether the opening mediation server supported by the second terminal supports a push notification, transmitting, to a first server, a third message comprising an event registration request for a second profile corresponding to the first profile, and receiving, from the first server, a fourth message comprising an event registration result according to the event registration request, the event registration result comprising information on whether an event is forwardable.

In accordance with another aspect of the disclosure, a first server in a wireless communication system is provided. The first server includes a transceiver, and a controller configured to perform control to receive, from a second server through the transceiver, a first message comprising an event registration request for a second profile corresponding to a first profile in case that the second server receives, from a first terminal, a request for transfer of the first profile to a second terminal, wherein the second server being for providing a profile and transmit a second message comprising event registration result according to the event registration request to the second server through the transceiver, the event registration result comprising information on whether an event is forwardable.

In accordance with another aspect of the disclosure, a second server in a wireless communication system is provided. The second server includes a transceiver and a controller configured to perform control to receive, from a first terminal through the transceiver, a second message for requesting transfer of a first profile installed in the first terminal to a second terminal in case that the first terminal receives, from the second terminal, a first message comprising at least one of an eUICC identifier installed in the second terminal, a type allocation code (TAC) of the second terminal, information on an opening mediation server supported by the second terminal, and an indicator indicating whether the opening mediation server supported by the second terminal supports a push notification, transmit, to a first server through the transceiver, a third message comprising an event registration request for a second profile corresponding to the first profile, and receive, from the first server through the transceiver, a fourth message comprising an event registration result according to the event registration request, the event registration result comprising information on whether an event is forwardable.

According to an embodiment of the disclosure, services may be effectively provided in a mobile communication system.

According to an embodiment of the disclosure, when a terminal attempts to re-install, in another terminal in a communication system, a profile installed in the terminal, the terminal may receive an activation code required for re-installation of the profile, reissued from a profile server, or receive a profile transfer request result from the profile server, first delete the profile to be transferred if necessary, transfer a proof of profile deletion, which may prove the deletion of the profile, to a server, transfer the activation code or the profile transfer request result to another terminal, and allow another terminal to efficiently download and install the profile from the profile server.

According to an embodiment of the disclosure, in a communication system, a profile server receives, from a terminal, a request for re-installing, in another terminal, a profile installed in the terminal, the profile server may request deletion of the profile from the terminal if necessary, request transfer of a proof of profile deletion if necessary, prepare a profile by configuring the state of the profile as a download-impossible state if necessary, register, in an opening mediation server, an event enabling the prepared profile to be downloaded, request, if necessary, from the opening mediation server, the corresponding event as a state in which the event cannot be forwarded to the terminal, generate, if necessary, an activation code or an event registration result enabling a prepared profiled to be downloaded, change the state of the profile as a downloadable state when the terminal has deleted the profile, change the state of an event registered in the opening mediation server, as a forwardable state, whereby reproduction of the profile and an error in the terminal may be prevented and the profile may be safely downloaded.

According to an embodiment of the disclosure, when an opening mediation server receives a request for registering an event for a prepared profile from a profile server in a communication system the opening mediation server may make configuration so that the corresponding event cannot be forwarded to a terminal if the profile server has requested the same, and make configuration so that the event may be forwarded to the terminal if the profile server has requested to enable the corresponding event to be forwarded to the terminal, whereby an error in the terminal may be prevented.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
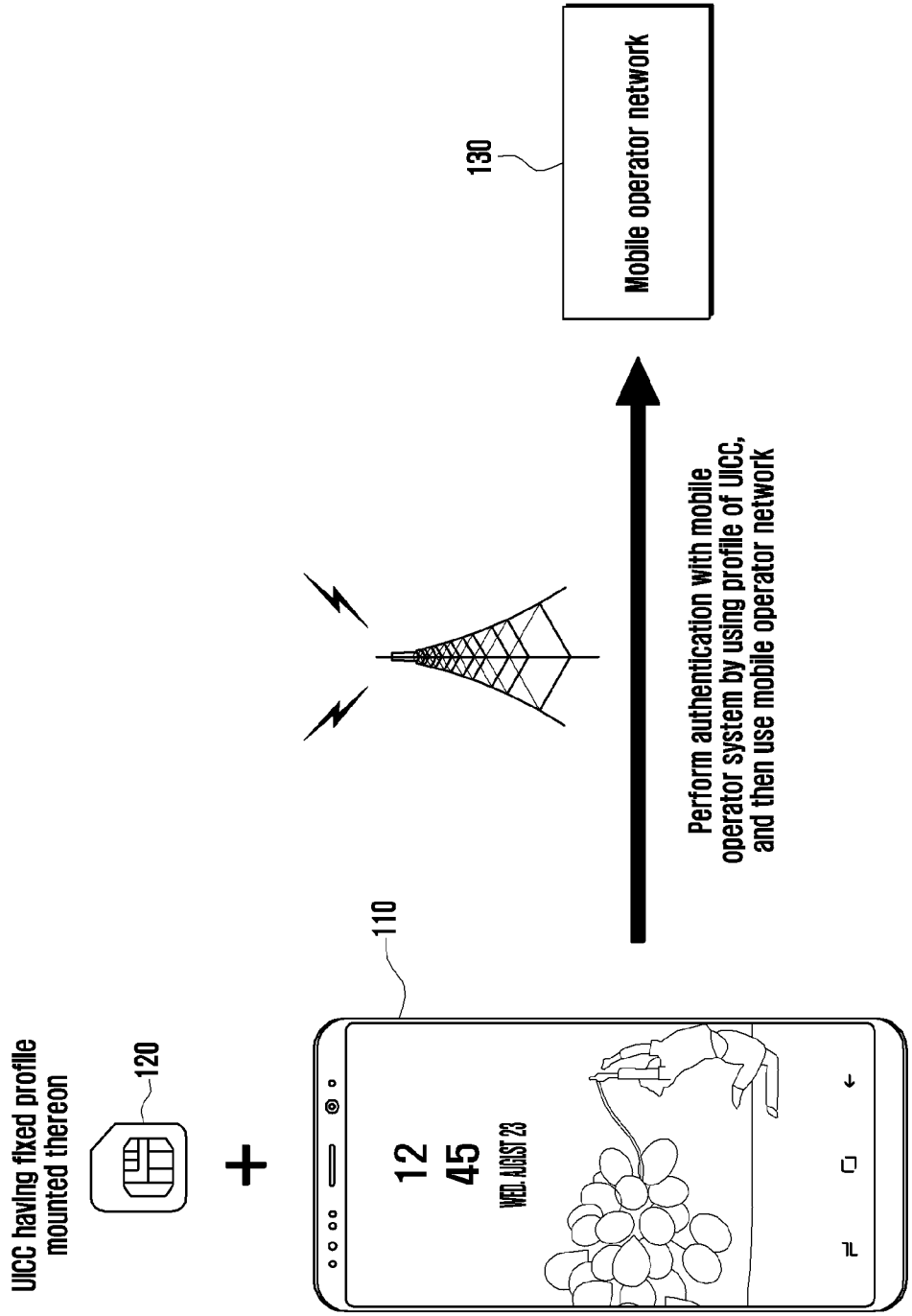
FIG. 1 illustrates a method of connecting to a mobile communication network by a terminal by using a universal integrated circuit card (UICC) equipped with a fixed profile, according to an embodiment of the disclosure.

The following description with reference to the accompanying drawings is provided to assist in a comprehensive understanding of various embodiments of the disclosure as defined by the claims and their equivalents. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

It will be understood that each block of the flowchart illustrations, and combinations of blocks in the flowchart illustrations, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The specific terms as used herein are provided to assist in understanding the disclosure, and the use of these terms may be changed into other forms without departing from the technical idea of the disclosure.

In the disclosure, a universal integrated circuit card (UICC) is a smart card that is used to be inserted into a mobile communication terminal or the like, and is also referred to as a UICC card.

A UICC means a chip which stores personal information of a mobile communication subscriber, such as network access authentication information, a phone number list, and an SMS, and performs subscriber authentication and traffic security key generation when a connection is made to a mobile communication network such as GSM, WCDMA, and LTE, thereby enabling safe use of mobile communication.

The UICC may include a communication application or an access control module for access to a network of a mobile communication operator by a terminal. Examples of such a communication application or an access control module may include a universal subscriber identity module (USIM), a subscriber identity module (SIM), and an IP multimedia service identity module (ISIM), etc. In addition, the UICC may provide a higher-level security function for mounting of various applications such as an electronic wallet, ticketing, and an electronic passport.

The UICC including the USIM is usually also referred to as a USIM card. Similarly, the UICC including the SIM module is usually also referred to as a SIM card.

In the disclosure, the terms "SIM card", "UICC card", "USIM card", and "UICC including ISIM" may be used as the same/similar meaning. For example, the same description of the disclosure is applicable to the SIM card, the USIM card, the ISIM card, or a general UICC card.

The SIM card stores personal information of a mobile communication subscriber, and performs subscriber authentication and traffic security key generation during access to a mobile communication network, thereby enabling safe use of mobile communication.

In general, the SIM card is manufactured as a dedicated card for a specific mobile communication operator upon a request from the corresponding operator, and is released in a state where authentication information for access to a network of the corresponding operator, for example, a universal subscriber identity module (USIM) application and an international mobile subscriber identity (IMSI), a K value, an OPc value, or the like, is embedded in the card in advance. Therefore, the SIM card is delivered to the corresponding mobile communication operator, and then the corresponding mobile communication operator provides the same to a subscriber. Thereafter, if necessary, the corresponding mobile communication operator may perform management of applications in the UICC, such as installation, modification, and deletion of the applications, by using an over the air (OTA) technology. The subscriber may use the network of the corresponding mobile communication operator and application services by inserting the UICC card into his/her own mobile communication terminal, and when replacing the terminal with a new one, may use the authentication information, the mobile communication phone number, the personal phonebook, and the like stored in the UICC card, as they are in the new terminal by taking out by taking out the UICC card from the old terminal and inserting the same into the new terminal.

However, the SIM card causes inconvenience in receiving, by the mobile communication terminal user, a service provided from other mobile communication operators. The mobile communication terminal user experiences inconvenience in physically obtaining a SIM card to receive the service from the mobile communication operator. For example, when a user travels abroad, the user needs to purchase a local SIM card to receive a local mobile communication service, which causes inconvenience to the user. A roaming service may somewhat reduce the inconvenience, but there is a problem in that the user needs to pay a relatively high rate and cannot receive the service in a case where a contract is not established between mobile communication operators.

Such inconvenience may be mostly solved when the SIM module is remotely downloaded and installed in the UICC card. For example, the SIM module for a mobile communication service to be used may be downloaded to the UICC card at the time desired by a user. Such UICC card may be used in a method of downloading and installing multiple SIM models, and selecting only one of the SIM modules. The UICC card may be fixed or may not be fixed in a terminal. In particular, the UICC fixed in a terminal is referred to as an embedded UICC (eUICC), and generally, the eUICC is fixed to the terminal, and means a UICC card capable of remotely downloading and selecting a SIM module. In the disclosure, the UICC card capable of remotely downloading and selecting the SIM module is referred to as an eUICC. For example, a UICC card that is fixed or not fixed in a terminal, among the UICC cards capable of remotely downloading and selecting the SIM module, is collectively referred to as an eUICC. In addition, downloaded SIM module information is collectively referred to as an eUICC profile, or more simply, a profile.

In the disclosure, an embedded UICC (eUICC) is a security module that is in a form of a chip embedded in a terminal, rather than a detachable security module that may be inserted into and detached from a terminal. Generally, the eUICC may be fixed in a terminal and used. The eUICC may download and install a profile by using an over the air (OTA) technology. The eUICC may be referred to as a UICC capable of downloading and installing a profile.

In the disclosure, a method of downloading and installing a profile to an eUICC by using the OTA technology may also be applied to a detachable UICC that may be inserted into and detached from a terminal. For example, embodiments of the disclosure may be applied to a UICC capable of downloading and installing a profile by using the OTA technology.

In the disclosure, the term "UICC" may be interchangeably used with the term "SIM," and the term "eUICC" may be interchangeably used with the term "eSIM."

A "profile" in this disclosure may mean a thing in which an application, a file system, an authentication key, etc. to be stored in a UICC are packaged in a software format.

A "USIM profile" in this disclosure may have the same meaning as the "profile", or may mean a thing in which information included in a USIM application in a profile is packaged in a software format.

In the disclosure, an operation in which a terminal enables a profile may mean an operation of changing the state of a corresponding profile to an enabled state and making a configuration so that the terminal may receive a communication service through the mobile operator having provided the profile. The profile in the enabled state may be represented as an "enabled profile".

In the disclosure, an operation in which a terminal disables a profile may mean an operation of changing the state of a corresponding profile to a disabled state and making a configuration so that the terminal cannot receive a communication service through the mobile operator having provided the profile. A profile in the disabled state may be represented as a "disabled profile".

In the disclosure, an operation in which a terminal deletes a profile may mean an operation of changing the state of a corresponding profile to a deleted state and making a configuration so that the terminal may no longer enable or disable the corresponding profile. A profile in the deleted status may be represented as a "deleted profile".

In the disclosure, an operation in which the terminal enables, disables, or deletes a profile may mean an operation of, instead of immediately changing the state of each profile to an enabled state, a disabled state, or a deleted state, first only marking the state of each profile as a to-be-enabled state, a to-be-disabled state, or a to-be-deleted state, and changing the state of each profile to an enabled state, a disabled state, or a deleted state after the terminal or the UICC of the terminal performs a specific operation (e.g., performing a refresh or reset command). An operation of marking the state of a specific profile as a scheduled state (e.g., a to-be-enabled state, a to-be-disabled state, or a to-be-deleted state) is not necessarily limited to displaying one scheduled state for one profile, and may include displaying the respective states of one or more profiles as the same scheduled state or different scheduled states, displaying the state of one profile as one or more scheduled states, or displaying the respective states of one or more profiles as the same or different one or more scheduled states.

In addition, when the terminal displays one or more scheduled states for a random profile, the displays of two scheduled states may be integrated into one. For example, when the state of a random profile is displayed as a to-be-disabled state and a to-be-deleted state, the state of the corresponding profile may be integrated and displayed as a to-be-disabled-and-deleted state.

In addition, an operation in which the terminal displays a scheduled state for one or more profiles may be sequentially or simultaneously performed. Furthermore, an operation in which the terminal displays a scheduled state for one or more profiles and then changes the actual state of a profile may be sequentially or simultaneously performed.

In the disclosure, a "profile provision server" may include a function of generating a profile, encrypting the generated profile, generating a profile remote management command, or encrypting the generated profile remote management command. The profile provision server may be expressed as a subscription manager data preparation (SM-DP), a subscription manager data preparation plus (SM-DP+), an off-card entity of profile domain, a profile encryption server, a profile generation server, a profile provisioner (PP), a profile provider, or a profile provisioning credentials holder (PPC holder).

In the disclosure, a "profile management server" may include a function of managing a profile. The profile management server may be expressed as a subscription manager secure routing (SM-SR), a subscription manager secure routing plus (SM-SR+), an off-card entity of eUICC profile manager, a profile management credentials holder (PMC holder), an eUICC manager (EM), a profile manager (PM) or the like.

In the disclosure, the profile provision server may mean a server having a function of a profile management server combined together. Therefore, in various embodiments of the disclosure, an operation of the profile provision server may also be performed by the profile management server. Likewise, an operation of the profile management server or the SM-SR may also be performed by the profile provision server.

In the disclosure, an "opening mediation server" may be expressed as a subscription manager discovery service (SM-DS), a discovery service (DS), a root SM-DS, and an alternative SM-DS. The opening mediation server may receive an event registration request (register event request or event register request) from one or more profile provision servers or opening mediation servers. In addition, the one or more opening mediation servers may be complexly used, wherein a first opening mediation server may receive an event registration request from a second opening mediation server as well as the profile providing server.

In the disclosure, the profile provision server and the opening mediation server may be collectively referred to as a "remote SIM provisioning (RSP) server". The RSP server may be expressed as a subscription manager XX (SM-XX).

In the disclosure, the term "terminal" may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other terms. In an embodiment, the terminal may include a cellular phone, a smartphone having a wireless communication function, a personal digital assistant (PDA) having a wireless communication function, a wireless modem, a portable computer having a wireless communication function, a photographing device having a wireless communication function, such as a digital camera, a gaming device having a wireless communication function, music storage and reproduction home appliances having a wireless communication function, Internet home appliances capable of performing wireless Internet access and browsing, and portable units or terminals having integrated combinations of such functions above. Furthermore, the terminal may include, but is not limited to, a machine to machine (M2M)

terminal and a machine type communication (MTC) terminal/device. In the disclosure, the terminal may be referred to as an electronic device.

In the disclosure, an "electronic device" may have a UICC embedded therein, the UICC capable of downloading and installing a profile. If the UICC is not embedded in the electronic device, the UICC physically separated from the electronic device may be connected to the electronic device by being inserted into the electronic device. For example, the UICC may be inserted into the electronic device in the form of a card. The electronic device may include the terminal. In this case, the terminal may be a terminal including the UICC capable of downloading and installing a profile. The UICC may be embedded in the terminal, and may also be inserted into the terminal so as to be connected to the terminal if the UICC is separated from the terminal. The UICC capable of downloading and installing a profile may be referred to as, for example, an eUICC.

In the disclosure, the terminal or the electronic device may include software or an application installed in the terminal or the electronic device to control the UICC or the eUICC. The software or application installed in the terminal or the electronic device for control of the UICC or the eUICC may be referred to as, for example, a local profile assistant (LPA).

In the disclosure, a "profile delimiter" may be referred to as a profile ID, an integrated circuit card ID (ICCID), a matching ID, an event identifier (event ID), an activation code, an activation code token, a command code, a command code token, a signed command code, an unsigned command code, or a factor matching an ISD-P or a profile domain (PD). The profile ID may indicate a unique identifier of each profile. The profile delimiter may further include an address of a profile provision server (SM-DP+) capable of indexing a profile. In addition, the profile delimiter may further include a signature of the profile provision server (SM-DP+).

In the disclosure, an "eUICC identifier (eUICC ID)" may be a unique identifier of the eUICC embedded in the terminal, and may be referred to as an EID. In addition, if a provisioning profile is pre-embedded in the eUICC, the eUICC identifier (eUICC ID) may be a profile ID of the corresponding provisioning profile. If, as in an embodiment, the terminal and the eUICC chip are not separated from each other, the eUICC identifier (eUICC ID) may be a terminal ID. In addition, the eUICC ID may also refer to a specific security domain of the eUICC chip.

In the disclosure, a "profile container" may be referred to as a profile domain. The profile container may be a security domain.

In the disclosure, an "application protocol data unit (APDU)" may be a message for interworking between the terminal and the eUICC. The APDU may be a message for interworking between a profile provider (PP) or a profile manager (PM) and the eUICC.

In the disclosure, profile provisioning credentials (PPC) may be a means used for mutual authentication, profile encryption, and signing between the profile provision server and the eUICC. The PPC may include at least one of a symmetric key, a Rivest-Shamir-Adleman (RSA) certificate and private key, an elliptic curved cryptography (ECC) certificate and private key, and a root certification authority (CA) and certificate chain. In addition, if there are multiple profile provision servers, different PPCs for the multiple profile provision servers may be used for or stored in the eUICC.

In the disclosure, profile management credentials (PMC) may be a means used for mutual authentication, transmission data encryption, and signing between the profile management server and the eUICC. The PMC may include at least one of a symmetric key, an RSA certificate and private key, an ECC certificate and private key, and a root CA and certificate chain. In addition, if there are multiple profile management servers, different PMCs for the multiple profile management servers may be used for or stored in the eUICC.

In the disclosure, an "AID" may be an application identifier. This value may be a delimiter for distinguishing between different applications in the eUICC.

In the disclosure, an "event" may be a term collectively referring to profile download, remote profile management, or other profile or eUICC management/process commands. The event may be referred to as a remote SIM provisioning operation (RSP operation) or an event record, and each event may be referred to as data including at least one of an event identifier (event ID, EventID) or a matching identifier (matching ID, MatchingID) corresponding to the event, an address (FQDN, ID address, or URL) of the profile provision server (SM-DP+) or the opening mediation server (SM-DS) where the corresponding event is stored, a signature of the profile provision server (SM-DP+) or the opening mediation server (SM-DS), and a digital certificate of the profile provision server (SM-DP+) or the opening mediation server (SM-DS).

The data corresponding to the event may be referred to as a "command code". A part or the entirety of a procedure using the command code may be referred to as a "command code processing procedure", a "command code procedure", or a local profile assistant application programming interface (LPA API)". The profile download may be interchangeably used with a profile installation.

In addition, an "event type" may be used as a term indicating whether a specific event is a profile download, remote profile management (e.g., deletion, activation, deactivation, replacement, update, and the like) or other profile or eUICC management/process commands, and may be referred to as an operation type (or OperationType), an operation class (or OperationClass), an event request type, an event class, an event request class, and the like. For a random event ID (EventID or MatchingID), a purpose of use (EventID source or MatchingID source) or a path through which a terminal has obtained the event identifier (EventID or MatchingID) may be designated.

In the disclosure, a "profile package" may be interchangeably used with a profile or used as a term indicating a data object of a specific profile, and may be referred to as a profile TLV or a profile package TLV. If the profile package is encrypted using an encryption parameter, the profile package may be referred to as a protected profile package (PPP) or a protected profile package TLV (PPP TLV). If the profile package is encrypted using an encryption parameter that may be decrypted by a specific eUICC only, the profile package may be referred to as a bound profile package (BPP) or a bundled profile package TLV (BPP TLV). The profile package TLV may be a data set expressing information constituting a profile in the TLV (tag, length, value) format.

In the disclosure, a "local profile management (LPM)" may be referred to as profile local management, local management, a local management command, a local command, a local profile management package (LPM package), a profile local management package, a local management package, and a local management command package, a local command package. The LPM may be used for changing the state (enabled, disabled, deleted) of a specific profile through software etc. installed in the terminal, or changing (updating) contents (e.g., profile nickname, profile metadata, or the like) of a specific profile. The LPM may include one or more local management commands, and in this case, a profile subject to each local management command may be the same or different for each local management command.

In the disclosure, a "remote profile management (RPM)" may be referred to as profile remote management, remote management, a remote management command, a remote command, a remote profile management package (RPM package), a profile remote management package, a remote management package, a remote management command package, and a remote command package. The RPM may be used as an application for changing the state (enabled, disabled, and deleted) of a specific profile, or changing (updating) contents (e.g., profile nickname, profile metadata, or the like) of a specific profile. The RPM may include one or more remote management commands, and in this case, a profile subject to each remote management command may be the same or different for each remote management command.

In the disclosure, a "certificate" or a "digital certificate" may indicate a digital certificate used for mutual authentication based on an asymmetric key including a pair of a public key (PK) and a secret key (SK). Each certificate may include one or more public keys (PKs), a public key identifier (PKID) corresponding to each public key, an identifier (certificate issuer ID) of a certificate issuer (CI) issuing the corresponding certificate, and a digital signature.

In addition, a "certificate issuer" may be referred to as a certification issuer, a certificate authority (CA), or a certification authority, and the like.

In the disclosure, the "public key (PK)" and the "public key identifier (PKID)" may be interchangeably used having the same meaning indicating a certificate including a specific public key or a corresponding public key, a part of a certificate including a part of a specific public key or a corresponding public key, a calculation result (e.g., a hash) value of a specific public key or a calculation result (e.g., a hash) value of a certificate including the corresponding public key, a calculation result (e.g., a hash) value of a part of a specific public key or a calculation result (e.g., a hash) value of a part of the certificate including the corresponding public key, or a storage space in which data is stored.

In the disclosure, if certificates (i.e., primary certificates) issued by one certificate issuer are used for issuing another certificate (i.e., secondary certificate), or the secondary certificates are used for issuing tertiary or higher certificates, a correlation of the corresponding certificates may be referred to as a certificate chain or a certificate hierarchy, and in this case, a CI certificate used for initial certificate issuance may be referred to as a root of certificate, the highest certificate, a root CI, a root CI certificate, a root CA, a root CA certificate, and the like.

In the disclosure, a "mobile operator" may indicate a business entity that provides a communication service to a terminal, and a business supporting system (BSS), an operational supporting system (OSS), a point of sale terminal (POS terminal), and other IT systems of a mobile operator may be collectively referred to as a mobile operator. In addition, in the disclosure, the mobile operator is not limited to a term representing only one specific business entity that provides communication services, but may be used as a term referring to a group or association (or consortium) of one or more businesses entities or a representative representing the group or association. In addition, in the disclosure, a mobile operator may be referred to as an operator (or OP or Op.), a mobile network operator (MNO), a mobile virtual network operator (MVNO), a service provider (or SP), a profile owner (PO), and the like, and each mobile operator may configure or receive an allocation of at least one name and/or object identifier (OID) of the mobile operator. If a mobile operator refers to a group, association, or representative of one or more business entities, a name or an object identifier of any group, association, or representative may be a name or an object identifier shared by all business entities belonging to the group or the association, or all business entities cooperating with the representative.

In the disclosure, an "AKA" may indicate an authentication and key agreement, and may indicate an authentication algorithm for accessing 3GPP and 3GPP2 networks.

In the disclosure, "K" is an encryption key value stored in the eUICC used in the AKA authentication algorithm.

In the disclosure, "OPc" is a parameter value that may be stored in the eUICC used in the AKA authentication algorithm.

In the disclosure, an "NAA" is a network access application program, and may be an application program stored in a UICC, such as a USIM or an ISIM for accessing a network. The NAA may be a network connection module.

In the disclosure, an "indicator" may be used to represent necessity or unnecessity of a random function, configuration, or operation, or may be used to represent the corresponding function, configuration, or operation itself. In addition, in the disclosure, the indicator may be expressed in various forms, such as an alphanumeric string, an operator indicating true/false (Boolean—TRUE or FALSE), a bitmap, an array, and a flag, and may be interchangeably used with other expressions having the same meaning.

Hereinafter, a method and apparatus for installing and managing an eUICC profile of the disclosure will be described in detail with reference to FIGS. 1 to 7.

FIG. 1 illustrates a method of connecting to a mobile communication network by a terminal by using a UICC equipped with a fixed profile, according to an embodiment of the disclosure.

Referring to FIG. 1, a UICC 120 may be inserted into a terminal 110. For example, the UICC 120 may be a detachable type or may be pre-embedded in the terminal.

With regard to the UICC equipped with the fixed profile, the fixed profile indicates that "access information" enabling access to a specific mobile operator is fixed. For example, the access information may be an IMSI that is a subscriber delimiter and a K or Ki value required to authenticate a network, together with the subscriber delimiter.

The terminal 110 according to various embodiments may perform authentication with an authentication processing system (e.g., a home location register (HLR) or AuC) of a mobile communication operator, by using the UICC 120. For example, an authentication process may be an authentication and key agreement (AKA) process. When the authentication is successful, the terminal may use a mobile communication service, such as using a phone call or mobile data, by using a mobile communication operator network 130 of a mobile communication system.

Figure 2:
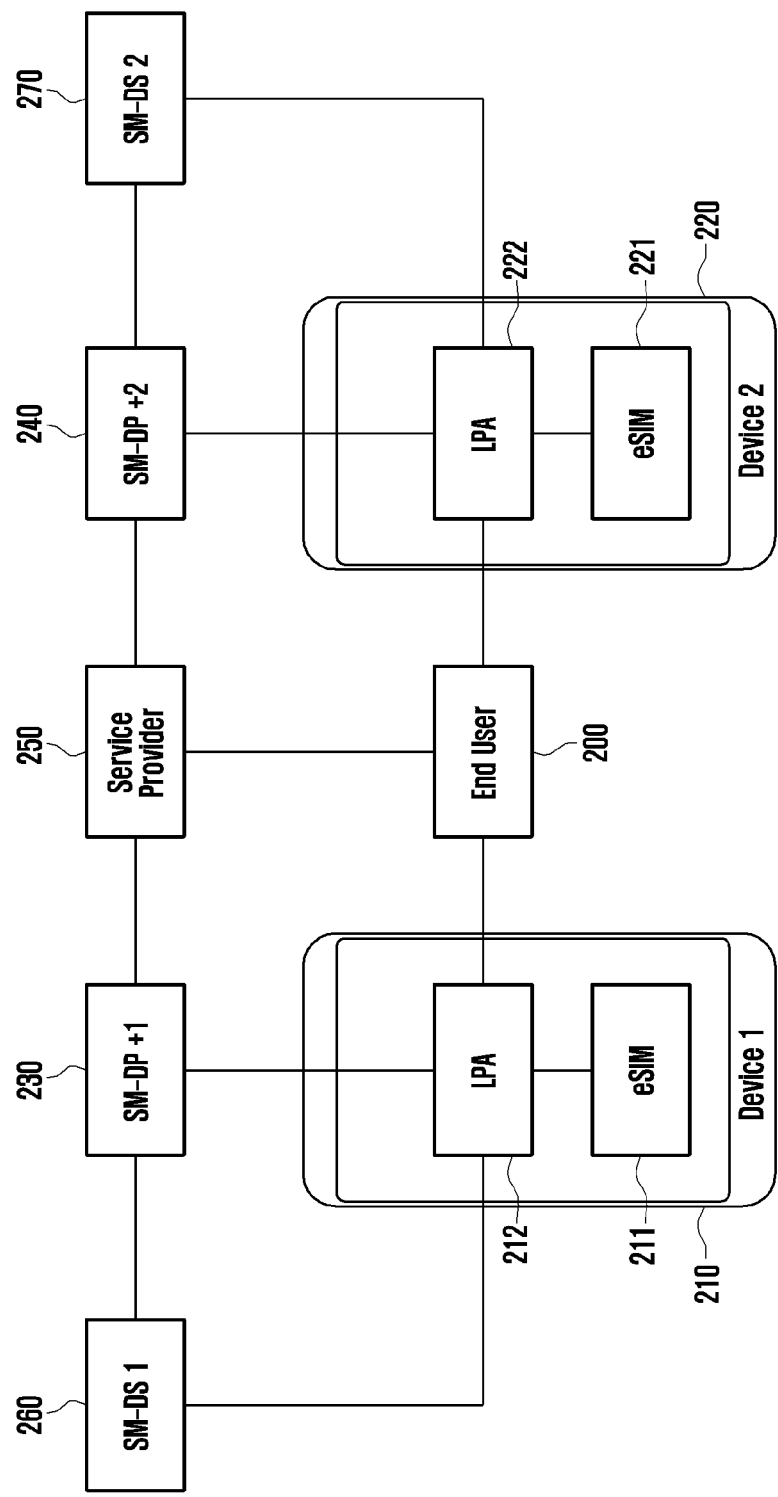
FIG. 2 illustrates a configuration of a system in which a terminal manages a profile installed in a first terminal and installs the profile in a second terminal upon a user input, according to an embodiment of the disclosure.

FIG. 2 illustrates a configuration of a system in which a terminal manages a profile installed in a first terminal and installs the profile in a second terminal upon a user input, according to an embodiment of the disclosure.

Referring to FIG. 2, a terminal 210 or 220 may have an eSIM 211 or 221 mounted thereon, and the eSIM 211 or 221 may have a profile (not shown) installed therein. In addition, the terminal 210 or 220 may have an LPA 212 or 222 installed therein. The eSIM 211 or 221 may be controlled by the LPA 212 or 222. A user 200 may control a profile installed in the eSIM 211 or 221 of each terminal 210 or 220 through the LPA 212 or 222.

The user 200 may receive a communication service from a service provider (hereinafter, referred to as a "communication business operator" or an "business operator" 250). To this end, the terminal 210 may have a profile (not shown) of the business operator 250 installed therein. When newly purchasing a new second terminal 220, the user may attempt to install a profile installed in a first terminal 210 again.

The business operator 250 may be connected to a first profile server 230 and a second profile server 240, the LPA 212 of the first terminal 210 may be connected to a first profile server 230, and the LPA 222 of the second terminal 220 may be connected to a second profile server 240. In this case, the first profile server 230 and the second profile server 240 may be the same or may be different from each other. In addition, when one or more business operator servers are included in the configuration, the business operator servers may be connected to respective separate profile servers, respectively, and the one or more business operator servers may be connected to the same profile server. In addition, for convenience of description, FIG. 2 illustrates a case in which each of the profile servers 230 and 240 is configured as a single server, but according to implementation and an embodiment, one or more profile servers (SM-DP+) may be included as server configuration. It should be noted that the configuration of various servers may be simply indicated as a single profile server.

The first profile server 230 and the second profile server 240 may be connected to a first opening mediation server 260 and a second opening mediation server 270, respectively, wherein the first opening mediation server and the second opening mediation server assist in generation of a connection between the profile servers 230 and 240 and the terminals 210 and 220, respectively. In addition, the LPA 212 of the first terminal 210 may be connected to the first opening mediation server 260, and the LPA 222 of the second terminal 220 may be connected to the second opening mediation server 270. In this case, the first profile server 230 and the second profile server 240 may be the same, or may be different from each other, and the first opening mediation server 260 and the second opening mediation server 270 may be the same, or may be different from each other. In addition, for convenience of description, FIG. 2 illustrates a case in which each of the opening mediation servers 260 and 270 is configured as a single server, but according to implementation and an embodiment, one or more opening mediation servers (SM-DS) may be included as server configuration. It should be noted that the configuration of various servers may be simply indicated as a single profile server.

A detailed operation and a message exchange procedure of the user 200, the business operator 250, the terminals 210 and 220, the eSIM 211 and 221, the LPA 212 and 222, the profile servers 230 and 240, and the opening mediation servers 260 and 270 will be described below with reference to the following drawings.

Figure 3:
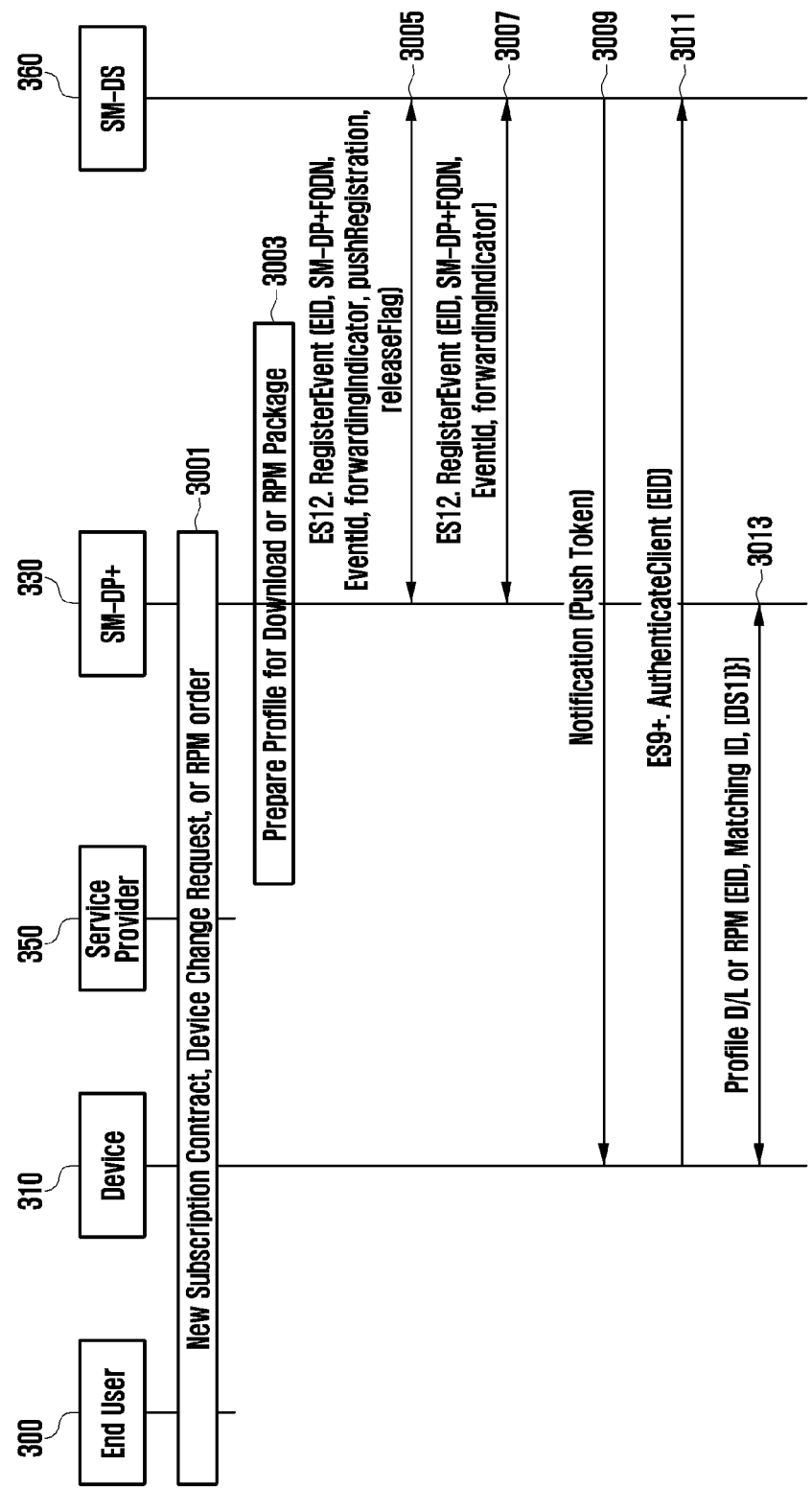
FIG. 3 is a sequence diagram illustrating a procedure in which in a case where a terminal and a profile server are connected to at least one opening mediation server and operate, the profile server registers an event in the at least one opening mediation server and the terminal acquires the event from the profile server and downloads a profile or a remote profile management package, according to an embodiment of the disclosure.

FIG. 3 is a sequence diagram illustrating a procedure in which in a case where a terminal and a profile server are connected to at least one opening mediation server and operate, the profile server registers an event in the opening mediation server and the terminal acquires the event from the profile server and downloads a profile or a remote profile management package, according to an embodiment of the disclosure.

For the configuration and description of a user 300, a terminal 310, a profile server 330, an opening mediation server 360, and a business operator 350, FIG. 2 may be referred to. For example, the user 300, the terminal 310, the profile server 330, the opening mediation server 360, and the business operator 350 illustrated in FIG. 3 correspond to the user 200, the first terminal 210, the first profile server 230, the opening mediation server 260, and the business operator 250 in FIG. 2, respectively.

Referring to FIG. 3, in operation 3001, the terminal 310 or the business operator 350 may request preparation of a profile or a remote profile management package from the profile server 330. For example, for the request for the preparation of the profile, the business operator 350 and the user 300 may make a contract for a service to be provided through the corresponding profile. The user 300 may select a service provided by the business operator 350 through the terminal 310, and may perform service reservation and purchase a profile corresponding the service reservation from the business operator 350. The business operator 350 may request preparation of the profile from the profile server 330 by using an ES2+.DownloadOrder function and an ES2+.ConfirmOrder function. In addition, the terminal 310 may transfer a profile corresponding to the profile installed in the terminal 310 upon a request from the user 300, to the profile server 330 requesting preparation so that another terminal (not shown) may download the profile. In addition, the business operator 350 may use an ES2+.RpmOrder function to request the preparation of the remote profile management package.

Referring to FIG. 3, in operation 3003, the profile server 330 may prepare the profile or the remote profile management package to be transferred to another terminal (not shown) or the terminal 310. For example, the profile may be generated upon a request from the business operator 350, and the business operator 350 may request the profile from the profile server 330 by using the ES2+.DownloadOrder function and the ES2+.ConfirmOrder function. In addition, the profile may be prepared upon a device change request transferred to the profile server 330 from the terminal 310 requesting the preparation so that another terminal (not shown) may download a profile corresponding to the profile installed in the terminal 310. In addition, the remote profile management package may be generated upon a request from the business operation 350, and the business operation 350 may request the remote profile management package from the profile server 330 by using the ES2+.RpmOrder function. The profile server 330 may assign and manage a matching identifier (matching ID) corresponding to the prepared profile or remote profile management package.

Referring to FIG. 3, in operation 3005, the profile server 330 may register, in the opening mediation server 360, an event corresponding to the prepared profile or remote profile management package. For example, the event registration in operation 3005 includes transmitting, to the opening mediation server 360, an event registration request (Register Event Request) message including at least one of an event identifier (event ID) corresponding to the profile or the remote profile management package prepared in the profile server 330, an identifier (eUICC ID (EID)) of an eUICC in the terminal 310, an address (SM-DP+ fully qualified domain name (FQDN)) of at least one profile server 330, and a forwarding indicator configured as "False" or "True", and responding with an event registration response (Register Event Response) message for the opening mediation server 360 to notify the profile server 330 of a result of the event registration. The profile server 330 may request the event registration request message from the opening mediation server 360 by using an ES12.RegisterEvent function. The event identifier may be identical to the matching identifier assigned in operation 3003.

In operation 3005, the event registration request message may include an event forwarding indicator (i.e., release flag or event release flag) indicating whether the opening mediation server 360 can forward, to the terminal 310, an event to be registered in the opening mediation server 360 upon a current request. The profile server 330 may configure, for the opening mediation server 360, whether the event to be registered can be forwarded, according to whether there is an event forwarding indicator or a configuration value of the corresponding indicator. In order to indicate to the opening mediation server 360 that the event to be registered in the opening mediation server 360 may be forwarded to the terminal 310, the profile server 330 may not include the event forwarding indicator in the event registration request message, or may include the event forwarding indicator configured as "True" or "NULL". In this case, the opening mediation server 360 may the registered event as a forwardable state upon the request, and may notify the terminal 310 of whether the event has been registered, or forward the event to the terminal 310 when there is an event forwarding request from the terminal 310. In addition, in order to indicate to the opening mediation server 360 that the event to be registered in the opening mediation server 360 cannot be forwarded to the terminal 310, the profile server 330 may not include the event forwarding indicator in the event registration request message, or include an event forwarding indicator configured as "False". In this case, the opening mediation server 360 may configure the event registered upon the request, as a forwarding-impossible state, and may not notify the terminal 310 of whether the event has been registered, or may respond to an event forwarding request from the terminal 310 with a response indication that there is no event.

In operation 3005, the event registration request message may include a push notification registration indicator (push registration or push registration flag) indicating whether the opening mediation server 360 may notify, through a push notification, the terminal 310 of an event to be registered in the opening mediation server 360 upon a current request can be registered. The profile server 330 may request, from the mediation server 360, whether push notification registration for the event to be registered may be performed according to whether there is a push notification registration indicator or a configuration value of the corresponding indicator. To make a request so that the opening mediation server 360 notifies, through a push notification, the terminal 310 of whether the event to be registered in the opening mediation server 360 is registered, the profile server 330 may not include the push notification registration indicator in the event registration request message, or may include a push notification registration indicator configured as "True" or "NULL". When the push notification registration is requested, the opening mediation server 360 may determine whether the push notification may be sent to the terminal 310, and if possible, configure the push notification of the registered event. In addition, a result of the push notification registration may be included in the event registration response message.

In operation 3005 in FIG. 3, as described above, the event registration is configured as an exchange of the event registration request (Register Event Request) message and the event registration response (Register Event Response) message. It should be noted that the event registration request message may include at least one of the above-described factors (e.g., the event identifier, the eUICC identifier, the profile provision server address, the forwarding indicator, the event forwarding indicator, and the event push notification indicator). In addition, the forwarding indicator, the event forwarding indicator, and the event push notification indicator may be omitted. These are applied the same to the following drawings.

Referring to FIG. 3, in operation 3007, the profile server 330 may make a request so that the event configured as forwarding-impossible to the terminal 310, among the events registered in the opening mediation server 360, is to be configured as forwardable. For example, transmission of an event forwarding request (Release Event Request) message in operation 3007 includes transmitting, to the opening mediation server 360, an event forwarding request (Release Event Request) message including at least one of an event identifier (event ID) corresponding to the profile or the remote profile management package prepared in the profile server 330, an identifier (eUICC ID (EID)) of an eUICC in the terminal 310, an address (SM-DP+ fully qualified domain name (FQDN)) of at least one profile server 330, and a forwarding indicator configured as "False" or "True", and responding with an event forwarding response (Release Event Response) message for the opening mediation server 360 to notify the profile server 330 of a result of the event forwarding configuration. The event identifier may be identical to the matching identifier corresponding to the profile or the remote profile management package prepared in the profile server 330, and may be identical to the event identifier included in the event registration request message transferred to the opening mediation server 360 by the profile server 330 before operation 3007. The profile server 330 may request the event forwarding request message from the opening mediation server 360 by using an ES12.ReleaseEvent function.

Referring to FIG. 3, in operation 3009, the opening mediation server 360 may notify the terminal 310 of whether the event for the terminal 310 has been registered. For example, the opening mediation server 360 notifies to the terminal 310 that the event for the terminal 310 has been registered upon the request from the profile server 330. The opening mediation server 360 may manage an event registration notification identifier (push token) corresponding to each terminal, and determine the event registration notification identifier of the terminal 310, corresponding to the registered event. The opening mediation server 360 may transfer an event registration notification including the event registration notification identifier to an event registration notification server (not shown), and the event registration notification server (not shown) may transfer the event registration notification including the event registration notification identifier to the terminal 210. The terminal 310 received the event registration notification may identify the opening mediation server 360 having provided the notification, by using the event registration notification identifier included in the notification, and determine an FQDN of an address of the opening mediation server 360.

Referring to FIG. 3, in operation 3011, the terminal 310 may transmit a message requesting an event to the opening mediation server 360. The requesting of the event may be performed before operation 3011 when the terminal 310 receives the event registration notification message from the opening mediation server 360 or the event registration notification server (not shown), when an event request period preconfigured for the terminal 310 has reached, or when there is an input of the user 300. The requesting of the event in operation 3011 may use, for example, a terminal authentication request (Authenticate Client Request) message including an identifier (eUICC ID (EID)) of an eUICC in the terminal 310, and the terminal 310 requests the terminal authentication request message from the opening mediation server 360 by using an ES9+.AuthenticateClient function. The opening mediation server 360 having received the event request message in operation 3011 may respond to the terminal 310 with an event list (Event Records). For example, the event list includes a list of events registered up to now aiming for an eUICC in the terminal 310. In addition, the event list includes event-related information. For example, the event-related information includes at least one of an FQDN of an address of the profile server 330 and an event identifier (event ID). For example, the responding with the event list in operation 3011 uses a terminal authentication response (Authenticate Client Response) message.

Referring to FIG. 3, in operation 3013, the terminal 310 may transmit a message requesting an event to the profile server 330. For example, the requesting of the event in operation 3013 uses a terminal authentication request (Authenticate Client Request) message including at least one of an identifier (eUICC ID (EID)) of an eUICC in the terminal 310, a matching identifier including an event identifier (event ID) received in 3011, and information on the opening mediation server 360 having received the event. The event identifier may be included as a matching identifier of the terminal authentication request message. In operation 3013, the profile server 330 may perform an RSP operation (i.e., providing a profile or a remote profile management package) corresponding to the matching identifier. For example, operation 3013 further includes exchanging a message between the terminal 310 and the profile server 330 more than one time, and an initial message transmitted, as a response, to the terminal 310 by the profile server 330 may be the terminal authentication response (Authenticate Client Response) message.

Figure 4:
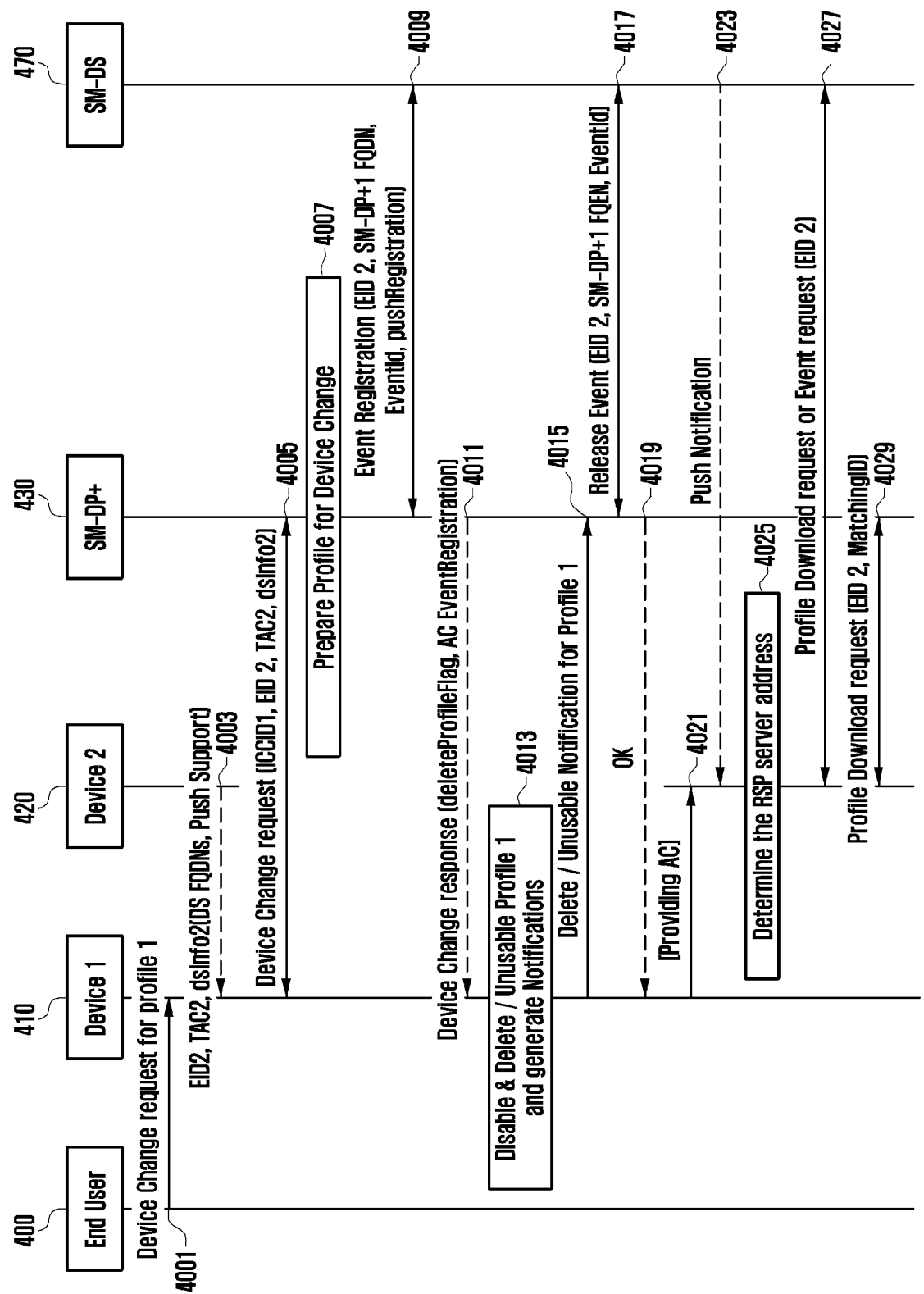
FIG. 4 is a sequence diagram illustrating a procedure in which a first terminal requests a device change for an installed profile from a second terminal through a profile server, the profile server registers, in an opening mediation server, an event corresponding to a profile prepared for the second terminal, and the second terminal downloads the profile prepared for the device change from the profile server by using corresponding information, according to an embodiment of the disclosure.

FIG. 4 is a sequence diagram illustrating a procedure in which a first terminal requests a device change for an installed profile from a second terminal through a profile server, the profile server registers, in an opening mediation server, an event corresponding to a profile prepared for the second terminal, and the second terminal downloads the profile prepared for the device change from the profile server by using corresponding information, according to an embodiment of the disclosure.

For the configuration and description of a user 400, a first terminal 410, a second terminal 420, a profile server 430, an opening mediation server 470, and a business operator (not shown) in FIG. 4, FIG. 2 may be referred to. For example, the user 400, the first terminal 410, the second terminal 420, the profile server 430, the opening mediation server 470, and the business operator (not shown) correspond to the user 200, the first terminal 210, the second terminal 220, the first profile server 230, the opening mediation server 260, and the business operator 250 in FIG. 2, respectively.

Referring to FIG. 4, in operation 4001, the user 400 may request transfer of a first profile from the first terminal 410. To this end, the user may identify, through the first terminal 410, information (profile metadata) relating to the first profile and information which should be known by a user who attempts to transfer the first profile. The information relating to the first profile and the information which should be known by a user who attempts to transfer the first profile may be stored in the first terminal 410 or the first profile.

The information relating to the first profile includes, for example, a name and a logo of a business operator, a profile policy, and the like. The information which should be known by a user who attempts to transfer the first profile includes, for example, the remaining number of times of profile transfer allowed by the business operator, costs which should be paid by the user for profile transfer, or the like. First profile information may include the contents requiring acquisition of information of the second terminal 420 to which the profile is to be transferred. The information of the second terminal 420 may selectively include at least one of an eUICC identifier installed in the second terminal 420, a type allocation code (TAC) of the second terminal 420, and information of the opening mediation server 470 supported by the second terminal 420. The information of the opening mediation server 470 supported by the second terminal 420 may include an FQDN of an address of at least one opening mediation server and an indicator indicating whether the corresponding opening mediation server supports a push notification. In addition, at least one address of a profile server to which the terminal needs to be connected for profile transfer may be stored in the first terminal 410 or the first profile. The profiler server to which the terminal needs to be connected for profile transfer may be, for example, the profile server 430.

In operation 4003, the first terminal 410 may acquire the information of the second terminal 420. The information of the second terminal 420 may selectively include at least one of an eUICC identifier installed in the second terminal 420, a type allocation code (TAC) of the second terminal 420, and information of the opening mediation server 470 supported by the second terminal 420.

In operation 4005, the first terminal 410 may request transfer of the first profile from the profile server 430. Operation 4005, for example, is performed by using at least one of an authentication initiation (initiate authentication) message, a terminal authentication request (authenticate client) message, and a transfer request message may be used, and/or further transmitting an operation type configured as a device change or profile transfer (transfer profile). In operation 4005, a procedure of request transfer of the first profile may include at least transmitting a profile identifier (ICCID) of the first profile. In addition, a procedure of requesting transfer of the first profile may selectively include at least one of an eUICC identifier installed in the second terminal 420, a type allocation code (TAC) of the second terminal, and information on the opening mediation server 470 supported by the second terminal 420.

In operation 4005, the profile server 430 may identify the possibility of transfer of the first profile. For convenience of description, FIG. 4 illustrates a single request, but according to an embodiment, operation 4005 may include one or more requests and responses. An operation in which the profile server 430 responds to the first terminal 410 with a result of identification that the transfer of the first profile is possible, and the first terminal 410 responds again to the profile server 430 upon identification by the user 400 may be included.

Referring to FIG. 4, in operation 4007, the profile server 430 may prepare a second profile to be transferred to the second terminal 420. The prepared second profile may be configured as a download-impossible state until the first profile is deleted from the first terminal 410 and the profile server 430 recognizes the deletion. Operation 4007, for example, may be performed by using at least one of a download order message, confirm order message, a remote management order (rpm order) message, a release order message, and a handle notification message.

Referring to FIG. 4, in operation 4009, the profile server 430 may register an event corresponding to the second profile in the opening mediation server 470. Operation 4009 may correspond to operation 3005 in FIG. 3, and an event registration request message may be used. Operation 4009 may be selectively performed when the first terminal 410 includes the information on the opening mediation server supported by the second terminal 420 in operation 4005. The FQDN of the address of the opening mediation server 470 may be included in the information on the opening mediation server supported by the second terminal 420. When the information on the opening mediation information supported by the second terminal 420 may include the address of at least one opening mediation server, the profile server 430 may register the same event in at least one another opening mediation server (not shown). In addition, the information on the opening mediation server supported by the second terminal 420 may include an indicator indicating whether the corresponding opening mediation server supports a push notification.

When the deletion of the first profile installed in the first terminal 410 needs to be identified to make a change so that the second profile prepared in operation 4007 may be downloaded to the second terminal 420, the profile server 430 may not include an event forwarding indicator in the event registration request message to the opening mediation server 470, or may include an event forwarding indicator configured as "False", in operation 4009, to indicate to the opening mediation server 470 that the event to be registered is not forwardable. For example, when the event forwarding indicator is not included or the event forwarding indicator configured as "False" is included, the opening mediation server 470 identifies that the configured event is not instantly or immediately forwardable.

In addition, in operation 4009, the opening mediation server 470 may respond to the profile server 430 with an event registration result. The event registration result may be transmitted as a response, together with a forwarding configuration value (e.g., forwardable or forwarding-impossible) of the event registered in the opening mediation server 470. In addition, when the profiler server 430 explicitly includes the possibility of event forwarding or the impossibility of event forwarding in the event registration request message, the event registration result may include that the corresponding operation has been successfully performed (or has failed to be performed).

In operation 4009, the profile server 430 may not include a push notification registration indicator in the event registration request message, or may include a push notification registration indicator configured as "True" or "NULL" to indicate whether the opening mediation server 470 may inform whether an event to be registered in the opening mediation server 470 is registered, to the terminal through a push notification. The process above may be selectively performed when information of an opening mediation server supported by a second terminal 420, transferred in operation 4005, includes an indicator indicating whether the corresponding opening mediation server supports a push notification. For example, when the indicator indicating that the corresponding opening mediation server supports a push notification is included in the information of the opening mediation server supported by the second terminal 420, the push notification registration indicator is set to "True" in the event registration request message. Alternatively, when the indicator indicating that the corresponding opening mediation server does not support a push notification is included or the indicator indicating whether the push notification is supported does not exists in the information of the opening mediation server supported by the second terminal 420, the push notification registration indicator may not be included in the event registration request message, or may be configured as "NULL".

In addition, in operation 4009, the opening mediation server 470 may respond to the profile server 430 with an event registration result. The event registration result may be transmitted as a response, together with a push notification forwarding configuration value (e.g., forwardable or forwarding-impossible) of the event registered in the opening mediation server 470. In addition, when the profiler server 430 explicitly requests or does not explicitly request a push notification in the event registration request message, the event registration result may include that the corresponding operation has been successfully performed (or has failed to be performed).

Referring to FIG. 4, in operation 4011, the profile server 430 may respond to the first terminal 410 with a result of the first profile transfer request. The result of the first profile transfer request may include information enabling downloading of a prepared second profile. The information enabling downloading of the second profile may selectively include at least one of an activation code (AC), a profile deletion indicator (delete profile flag), and an event registration indicator (event registration flag), which correspond to the second profile. For example, in case that the profile server 320 approves the transfer request of the first profile, the information enabling downloading of the prepared second profile is included.

In operation 4011, the activation code may at least include an FQDN of an address of the profile server 430 in which a second profile is stored, and an event identifier (MatchingID) connected to the second profile. In addition, the profile server 430 may include, in the activation code, an FQDN of an address of the opening mediation server 470 for which event registration is completed. In operation 4009, one or more opening mediation servers 470 (or not shown) are registered, the profile server 430 may include, in the activation code, FQDNs of addresses of the one or more opening mediation servers, or may select an FQDN of an address of one opening mediation server and include the same.

In operation 4011, when an event is registered in at least one opening mediation server 470, the profile server 430 may include, in a first profile transfer request result, an event registration indicator configured as "True" or "NULL". In addition, the profile server 430 includes the event registration indicator, the activation code may not be included in the first profile transfer request result.

In operation 4011, when the profile server 430 needs to identify whether the first terminal 410 has detected the first profile before the first terminal 410 transfers information for downloading the second profile to the second terminal 420, before the second terminal 420 requests the second profile from the profile server 430, or before the second terminal 420 requests information for downloading the second profile from the opening mediation server 470, the profile server 430 may include a profile deletion indicator configured as "True" or "NULL", in the first profile transfer request result.

Referring to FIG. 4, in operation 4013, the first terminal 410 may delete the first profile upon the request from the profile server 430, and generate a deletion result (delete notification) to be notified to at least one notification reception server configured in the first profile. When the first profile needs to be deactivated before deletion of the first profile, the first terminal 410 may deactivate the profile, and in this case, the first terminal 410 may generate a deactivation result to be notified to at least one notification reception server configured in the first profile. The first profile deactivation and deletion results may at least include a profile identifier (ICCID) of the first profile. The first profile deactivation and deletion results may include a certificate of an eSIM (not shown) mounted on the first terminal 410 and a certificate on a certificate layer structure of the corresponding certificate. In addition, the first profile deactivation and deletion results may include a digital signature generated by using a secret key paired with a public key included in the certificate of the eSIM (not shown).

Operation 4013 is performed by using at least one of, for example, a profile deactivation (disable profile) message, a profile deletion (delete profile) message, and a notification list acquisition (retrieve notifications list) message.

In operation 4015, the first terminal 410 may notify the first profile deactivation and deletion results to a server having a notification reception address (recipient address) included in the deactivation and deletion results generated in operation 4013. For convenience of description of the drawing, FIG. 4 illustrates that the first terminal 410 notifies the profile server 430 of the deactivation and deletion results. However, this is merely provided as an embodiment, the deactivation and deletion results may be transferred to another profile server (e.g., the second profile server 240 illustrated in FIG. 2 or a third profile server that is not shown), and the deactivation and deletion results may be separately transferred.

Operation 4015 is performed by using, for example, a notification processing (handle notification) message. In addition, when the first profile is already in the deactivated state, the first terminal 410 may omit the operation of deactivating the first profile and the operation of notifying the profile server 430 of the deactivation result in operation 4013. In operation 4015, each server having received the result may verify the result and transfer a result of the verification to the first terminal 410, the business operator (not shown), the profile server 430, and another profile server that is not shown in FIG. 3.

In operation 4015, the profile server 430 may identify that the first terminal 410 has deleted the first profile, and configure the state in which the second profile prepared in operation 4007 may be downloaded. In addition, the profile server 430 may selectively notify the first terminal 410 of the state in which the first or second profile may be downloaded.

Referring to FIG. 4, in operation 4017, the profiler server 430 may transfer an event forwarding request (Release Event Request) message for requesting to configure, as forwardable, an event corresponding to the second profile configured as the downloadable state in operation 4015, among events registered in the opening mediation server 470. The event may be an event requested and configured as event forwarding-impossible in operation 4009. Operation 4017 may correspond to operation 3007 in FIG. 3. For example, transferring of the event forwarding request (Release Event Request) message in operation 4017 includes transmitting, to the opening mediation server 470, an event forwarding request (Release Event Request) message including at least one of an event identifier (event ID) corresponding to a remote profile management package or a profile prepared in the profile server 430, an identifier (eUICC ID (EID)) of an eUICC in the terminal 410, an address (SM-DP+ fully qualified domain name (FQDN)) of at least one profile server 430, and a forwarding indicator configured as "False" or "True", and responding with the event forwarding response (Release Event Response) message so that the opening mediation server 470 notifies the profile server 430 of the event forwarding configuration result. The event forwarding request message may be requested by the profiler server 430 from the opening mediation server 470 by using an ES12.ReleaseEvent function. The opening mediation server 470 having received the event forwarding request (Release Event Request) message may configure the state in which the event may be forwarded to the terminal.

Referring to FIG. 4, in operation 4019, the profile server 430 may transfer the first profile deletion verification result to the first terminal 410.

Referring to FIG. 4, in operation 4021, the first terminal 410 may inform the user 400 or the second terminal 420 about the state in which the second profile may be downloaded. For example, the first terminal 410 transfers, to the second terminal 420, the activation code transferred in 4011. As an example of transferring the activation code to the second terminal 420 by the first terminal 410, the first terminal 410 may convert the activation code into the form of a QR code or an image or convert the same into the form of a character string, output the same, and notify that the activation code is prepared to the user 400. The user 400 may input the activation code output on a screen of the first terminal 410 in the second terminal 420.

For example, in operation 4021, the first terminal 410 outputs, on a screen, that the second profile is prepared, or may directly transfer the result to the second terminal 420 through connection such as wired connection, Wi-Fi, Bluetooth, and NFC.

Referring to FIG. 4, in operation 4023, the opening mediation server 470 may notify the second terminal 420 of the registration of the event. The opening mediation server 470 may manage an event registration notification identifier (push token) corresponding to each terminal, and determine an event registration notification identifier of the second terminal 420, which corresponds to the registered event. The opening mediation server 470 may transfer, to an event registration notification server (not shown), an event registration request including the event registration notification identifier, and the event registration notification server (not shown) may transfer, to the second terminal 420, an event registration notification including the event registration notification identifier.

Operations 4021 and 4023 may be independently performed, and it should be noted that a relationship between timings at which respective operations are performed may vary according to implementation of the terminal, the profile server, and the opening mediation server.

Referring to FIG. 4, in operation 4025, the second terminal 420 may determine an RSP server (opening mediation server or profile server). For example, the second terminal 420 extracts an FQDN of a profile server address or an FQDN of an opening mediation server address from the activation code received in operation 4021, and determine an RSP server as a server for transferring a profile download request or an event request. In addition, the second terminal 420 having received the event registration notification in operation 4023 may identify the opening mediation server 470 having provided the notification, by using the event registration notification identifier included in the notification, and determine the FQDN of the address of the opening mediation server 470.

Referring to FIG. 4, in operation 4027, the second terminal 420 may transmit, to the opening mediation server 470, a message requesting event forwarding. Operation 4027 may correspond to operation 3011 of FIG. 3. Operation 4027 may be performed when the event registration notification message is received from the opening mediation server 470 or the event registration notification server (not shown) in the previous operation, when the event forwarding period preconfigured for the second terminal 420 has reached, or upon an input of the user 400. The event request in operation 4027 may use, for example, a terminal authentication request (Authenticate Client Request) message including an identifier (eUICC ID (EID)) of an eUICC in the second terminal 420, the second terminal 420 may request the terminal authentication request message from the opening mediation server 470 by using the ES9+.AuthenticationClient function. In operation 4027, the opening mediation server 470 having received the event request message may respond to the second terminal 420 with an event list (event records). For example, the event list includes the event list may include a list of events registered up to now aiming for an eUICC in the second terminal 420. In addition, the event list may include event-related information. For example, the event-related information includes at least one of an FQDN of an address of the profile server 430 and an event identifier (event ID). For example, the responding with the event list uses a terminal authentication response (Authenticate Client Response) message.

Referring to FIG. 4, in operation 4029, the second terminal 420 may transmit, to the profiler server 430, a message requesting an event. For example, the event request in operation 4029 uses a terminal authentication request (Authenticate Client Request) message including at least one of an identifier (eUICC ID (EID)) of an eUICC in the second terminal 420, a matching identifier including the event identifier (event ID) received in operation 4027, and information on the opening mediation server 270 having received the event. The event identifier may be included as a matching identifier of the terminal authentication request message. In operation 4029, the profile server 430 may perform an RSP operation (providing a profile or a remote profile management package) corresponding to the matching identifier. For example, operation 4029 further includes exchanging a message between the second terminal 420 and the profile server 430 one or more times, and an initial message transmitted as a response to the second terminal 420 by the profile server 430 may be a terminal authentication response (Authenticate Client Response) message.

Figure 5:
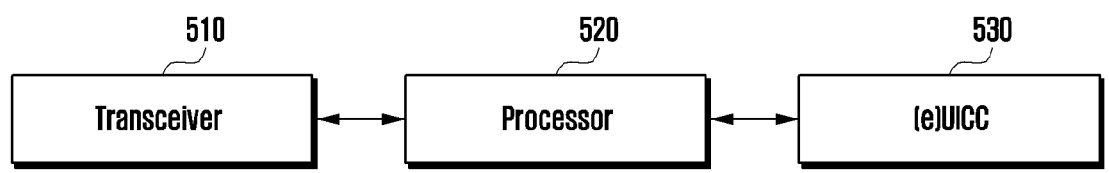
FIG. 5 is a block diagram illustrating elements of a terminal according to an embodiment of the disclosure.

FIG. 5 is a block diagram illustrating elements of a terminal according to an embodiment of the disclosure.

The terminals (e.g., the first terminal and the second terminal) described in the disclosure may correspond to the first terminal and the second terminal described with reference to FIG. 2, respectively. Each of the first terminal and the second terminal may be an embodiment of the terminal in FIG. 2, and the expressions "first" and "second" are merely used to indicate that respective terminals are physically different terminals.

Referring to FIG. 5, the terminal may include a transceiver 510 and a processor 520. Furthermore, the terminal may also include a UICC 530. For example, the UICC 530 is inserted into the terminal or may be an eUICC embedded in the terminal.

The transceiver 510 may transmit and receive signals, information, data, etc. to and from a profile server.

The transceiver 510 according to an embodiment of the disclosure may transmit, to the profile server, a message to request profile transfer, receive, from the profile server, an activation code, whether an event is registered in an opening mediation server, and whether a profile needs to be deleted, and transmit a result of the deletion of the profile to the profile server.

The transceiver 510 according to an embodiment of the disclosure may transmit, to the profile server, a message to request a profile by using an activation code, and may receive a profile package.

The transceiver 510 according to an embodiment of the disclosure may transmit an event request message to the opening mediation server, receive an event list from the opening mediation server, transmit, to the profile server, a message to request a profile by using the event list, and receive a profile package.

The transceiver 510 according to an embodiment of the disclosure may control the terminal to receive an event registration notification from the opening mediation server, transmit an event request message to the opening mediation server, receive an event list from the opening mediation server, transmit, to the profile server, a message to request a profile, receive a profile package from the profile server, and install the profile package.

The processor 520 is an element that generally controls the terminal. The processor 520 may control an overall operation of the terminal according to various embodiments of the disclosure. The processor 520 may be referred to as a controller. According to an embodiment of the present disclosure, the processor 520 may include at least one processor.

The processor 520 according to an embodiment of the disclosure may control the terminal to receive a profile transfer request from a user, identify profile transfer information, transmit, to the profile server, a message to request profile transfer, receive, from the profile server, an activation code or whether an event is registered in an opening mediation server and whether a profile needs to be deleted, delete the profile, transmit a result of the deletion of the profile to the profile server, and transfer the activation code or profile transfer preparation completion to another terminal.

The processor 520 according to an embodiment of the disclosure may control the terminal to receive an activation code transferred from another terminal, transmit a message to request a profile to a profile server by using the activation code, receive a profile package from the profile server, and install the profile package.

The processor 520 according to an embodiment of the disclosure may control the terminal to receive the activation code, the profile transfer preparation completion, or event registration completion transferred from another terminal, determine an opening mediation server by using the activation code or terminal configuration, transmit an event request message to the opening mediation server, receive an event list from the opening mediation server, transmit, to the profile server, a message to request a profile by using the event list, receive a profile package from the profile server, and install the profile package.

The processor 520 according to an embodiment of the disclosure may control the terminal to receive an event registration notification from an opening mediation server, determine the opening mediation server by using an event registration notification identifier, transmit an event request message to the opening mediation server, receive an event list from the opening mediation server, transmit, to a profile server, a message to request a profile by using the event list, receive a profile package from the profile server, and install the profile package.

The UICC 530 according to an embodiment of the disclosure may download a profile and install the profile. Furthermore, the UICC 530 may manage the profile.

The UICC 530 may operate upon the control of the processor 520. Alternatively, the UICC 530 may include a processor or controller for installing a profile, or an application may have been installed in the UICC. A part of the application may have been installed in the processor 520.

The terminal may further include a storage unit (not shown), and may store data, such as a basic program, an application program, or configuration information for an operation of the terminal. In addition, the storage unit may include at least one storage medium among a flash memory type, a hard disk type, a multimedia card micro type, a card type memory (e.g., a secure digital (SD) or extreme digital (XD) memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Furthermore, the processor 520 may perform various operations by using various programs, contents, data, etc. stored in the storage unit.

In a wireless communication system according to an embodiment of the disclosure, a terminal for managing a profile for connection to a network by using an embedded universal integrated circuit card (eUICC) may include a transceiver, and at least one processor for controlling the terminal to: receive, from a user, an input of a request for transfer of the profile, identify profile transfer information, transmit, to a profile server, a message to request profile transfer, receive, from the profile server, an activation code or whether an event is registered or whether the profile needs to be deleted, delete the profile, transmit a result of the deletion of the profile to the profile server, transfer the activation code or a profile transfer request result to another terminal, receive the activation code or the profile transfer request result transferred from another terminal, transmit an event request message to an opening mediation server by using the activation code or configuration stored in the terminal, receive an event list from the opening mediation server, transmit, to the profile server, a message to request the profile by using the event list, receive a profile package from the profile server, and install the profile package.

In a wireless communication system according to an embodiment of the disclosure, a terminal for managing a profile for connection to a network by using an embedded universal integrated circuit card (eUICC) may include a transceiver, and at least one processor for controlling the terminal to: receive, from a user, an input of a request for transfer of the profile, identify profile transfer information, transmit, to a profile server, a message to request profile transfer, receive, from the profile server, an activation code or whether an event is registered or whether the profile needs to be deleted, delete the profile, transmit a result of the deletion of the profile to the profile server, transfer a profile transfer request result to another terminal, receive an event registration notification from an opening mediation server, transmit an event request message to the opening mediation server by using the event registration notification, receive an event list from the opening mediation server, transmit, to the profile server, a message to request the profile by using the event list, receive a profile package from the profile server, and install the profile package.

Figure 6:
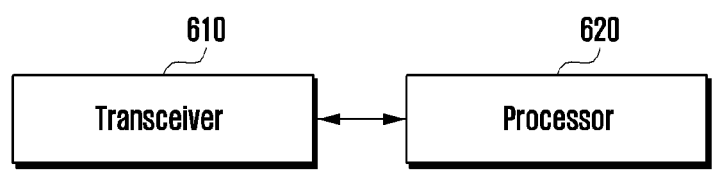
FIG. 6 is a block diagram illustrating elements of a profile server according to an embodiment of the disclosure.

FIG. 6 is a block diagram illustrating elements of a profile server according to an embodiment of the disclosure.

Each of the profile servers (e.g., the first profile server and the second profile server) described in the disclosure may correspond to the profile server described with reference to FIG. 2. Each of the first profile server and the second profile server may be an embodiment of the server in FIG. 2, and the expressions "first" and "second" are merely used to indicate that respective profile servers are physically different profile servers.

Referring to FIG. 6, the profile server may include a transceiver 610 and a processor 620.

The transceiver 610 may transmit and receive signals, information, data, etc. to and from a terminal, an opening mediation server, or a business operator.

The transceiver 610 according to an embodiment of the disclosure may receive a profile transfer request message from a terminal, transmit an event registration request message to an opening mediation server, transmit, to the terminal, a message including an activation code and whether a profile needs to be deleted, receive a profile deletion message from the terminal, transmit an event forwarding request message to the opening mediation server, receive a profile download request message from the terminal, transmit a profile package to the terminal when the state of the profile is a downloadable state, and transmit an error code when the state of the profile is a download-impossible state.

The processor 620 is an element for generally controlling the profile server. The processor 620 may control an overall operation of the profile server according to various embodiments of the disclosure. The processor 620 may be referred to as a controller. According to an embodiment of the disclosure, the processor 620 may include at least one processor.

The processor 620 according to an embodiment of the disclosure may control the profile server to receive a profile transfer request message from a terminal, identify whether a profile is transferable, prepare a profile for transfer of the existing profile, generate an activation code on which the profile is downloadable, configure a state of the prepared profile as a download-impossible state when the existing profile needs to be deleted, determine whether event registration in an opening mediation server is required, determine whether the event to be registered in the opening mediation server is forwardable, transmit an event registration request message including whether the event is forwardable to the opening mediation server, transmit, to the terminal, a message including an activation code and whether the profile needs to be deleted, receive a result of the deletion of the profile from the terminal, change a state of the profile into the downloadable state, transmit an event forwarding request message to the opening mediation server, receive a profile download request message from the terminal, determine whether a state of the profile is the downloadable state, transmit a profile package to the terminal when the state of the profile is the downloadable state, and transmit an error code when the state of the profile is the download-impossible state.

The profile server may further include a storage unit (not shown), and store data, such as a basic program, an application program, or setting information for an operation of the profile server. In addition, the storage unit may include at least one storage medium among a flash memory type, a hard disk type, a multimedia card micro type, a card type memory (e.g., an SD or XD memory), a magnetic memory, a magnetic disk, an optical disk, a random-access memory (RAM), a static random-access memory (SRAM), a read-only memory (ROM), a programmable read-only memory (PROM), or an electrically erasable programmable read-only memory (EEPROM). Furthermore, the processor 620 may perform various operations by using various programs, content, data, etc. stored in the storage unit.

In a wireless communication system according to an embodiment of the disclosure, a profile server for providing a profile for connection to a network to a terminal may include a transceiver, and at least one processor for controlling the profile server to: receive a transfer request message of the profile from the terminal, determine whether the profile is transferable, generate an activation code enabling the profile or a new profile to be downloaded, configure a state of the prepared profile as a download-impossible state when the profile is deleted and transferrable from the terminal, transmit an event registration request message for the prepared profile to an opening mediation server, when the requested event is forwardable after the deletion of the profile, further making a request to the opening mediation server so that the event cannot be forwarded, transmit, to the terminal, the activation code or whether the event is registered and whether the profile needs to be deleted, receive a result of the deletion of the profile from the terminal, change the state of the profile as a downloadable state, transmit an event forwarding request message to the opening mediation server, receive a profile download request message from the terminal, determine whether the state of the profile is a downloadable state, transmit a profile package from the terminal when the state of the profile is the downloadable state, when the state of the profile is a download-impossible state, transmit an error code or verify the profile deletion result included in the profile download request, and when there is not profile deletion result or the verification has failed, transmit the error code.

Figure 7:
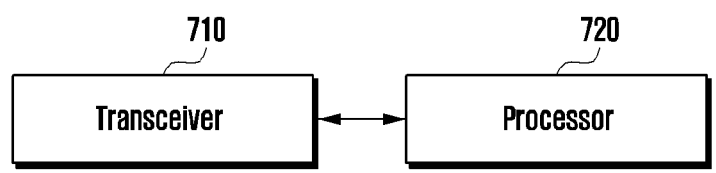
FIG. 7 is a block diagram illustrating elements of an opening mediation server according to an embodiment of the disclosure.

FIG. 7 is a block diagram illustrating elements of an opening mediation server according to an embodiment of the disclosure.

Referring to FIG. 7, the opening mediation server may include a transceiver 710 and a processor 720.

The transceiver 710 may transmit and receive signals, information, data, etc. to and from a terminal, a profile server, or a business operator.

The transceiver 710 according to an embodiment of the disclosure may receive a profile registration request message from a profile server, receive an event forwarding request message from the profile server, transmit, to the terminal, an event registration notification including an event registration notification identifier, receive an event request message from the terminal, and transmit an event list to the terminal.

The processor 720 is an element for generally controlling the profile server. The processor 720 may control an overall operation of the profile server according to various embodiments of the disclosure. The processor 720 may be referred to as a controller. According to an embodiment of the disclosure, the processor 720 may include at least one processor.

The processor 720 according to an embodiment of the disclosure may receive an event registration request message from a profile server, generate an event list, configure the state of a generated event as a forwarding-impossible state, receive an event forwarding request message from the profile server, configure the state of the event as a forwardable state, transmit an event registration notification including an event registration notification identifier to the terminal, receive an event request message from the terminal, and transmit the event list to the terminal.

The opening mediation server may further include a storage unit (not shown), and store data, such as a basic program, an application program, or setting information for an operation of the profile server. In addition, the storage unit may include at least one storage medium among a flash memory type, a hard disk type, a multimedia card micro type, a card type memory (e.g., an SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Furthermore, the processor 720 may perform various operations by using various programs, content, data, etc. stored in the storage unit.

In a wireless communication system according to an embodiment of the disclosure, an opening mediation server for providing a terminal with profile download information for connection to a network may include: a transceiver, and at least one processor for performing control to: receive, from a profile server, an event registration request message of a prepared profile and whether an event is forwardable, generate an event list, configure the state of the event as a forwarding-impossible state when the event is not forwardable, transmit event generation and forwarding configuration to the profile server, receive an event forwarding request message from the profile server, configure the state of the event as a forwardable state, selectively transmit an event registration notification including an event registration notification identifier to the terminal, receive an event request message from the terminal, and transmit the event list to the terminal.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via another element (e.g., a third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" is implemented in the form of an application-specific integrated circuit (ASIC).

Various embodiments of the disclosure may be implemented as software (e.g., a program) including one or more instructions that are stored in a storage medium (e.g., an internal memory or external memory) that is readable by a machine (e.g., a computer). The machine refers to a device that may invoke the stored instructions from the storage medium and operate according to the invoked instructions, and may include terminals (e.g., the first terminal 210 and the second terminal 220) according to various embodiments of the disclosure. When the instructions are executed by a processor (e.g., the processor 520 of FIG. 5, the processor 620 of FIG. 6, or the processor 720 of FIG. 7), the processor may perform functions corresponding to the instructions, with or without using one or more other components under the control of the processor. The instructions each may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the above-described sub elements may be omitted, or other sub elements may be added to various embodiments. Alternatively, or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a subscription manager discovery service (SM-DS) in a wireless communication system for transferring a first embedded universal integrated circuit card (eUICC) profile of a first terminal to a second terminal, the method comprising:
   receiving, from a subscription manager data preparation plus (SM-DP+), an event registration request message for an event related to a second eUICC profile to be installed in the second terminal, the event registration request message indicating that the event related to the second eUICC profile is not forwardable, and the second eUICC profile corresponding to the first eUICC profile installed in the first terminal; and
   transmitting, to the SM-DP+, an event registration response message in response to the event registration request message, the event registration response message comprising information indicating that the event related to the second eUICC profile is not forwardable to the second terminal,
   wherein the event related to the second eUICC profile is indicated as forwardable, based on identification of a deletion of the first eUICC profile from the first terminal.

2. The method of claim 1, wherein the event registration request message comprises at least one of:
   an event identifier of the second eUICC profile prepared by the SM-DP+, and
   an event forwarding indicator indicating that the event is to be registered by the SM-DS as not forwardable.

3. The method of claim 1, further comprising:
   receiving, from the SM-DP+, an event forwarding request message for requesting to configure the event as forwardable, in case that deletion of the first eUICC profile by the first terminal is identified by the SM-DP+;
   configuring the event as forwardable, based on the event forwarding request message; and
   transmitting, to the SM-DP+, an event forwarding response message for confirming the event being configured as forwardable.

4. The method of claim 3, further comprising:
   transmitting, to the second terminal, a notification message notifying that the event related to the second eUICC profile has been registered in case that an activation code is transferred from the first terminal to the second terminal;
   receiving, from the second terminal, a message for requesting forwarding of the event; and
   transmitting, to the second terminal, an event list comprising information for downloading the second eUICC profile.

5. A method performed by a subscription manager data preparation plus (SM-DP+) for providing an embedded universal integrated circuit card (eUICC) profile in a wireless communication system, the method comprising:
   receiving, from a first terminal, a transfer request message for requesting transfer of a first eUICC profile installed in the first terminal to a second terminal, the transfer request message comprising at least one of an eUICC identifier installed in the second terminal, a type allocation code (TAC) of the second terminal, information on a subscription manager discovery service (SM-DS) supported by the second terminal, and an indicator indicating whether the SM-DS supported by the second terminal supports a push notification;

preparing a second eUICC profile for transfer to the second terminal, the second eUICC profile corresponding to the first eUICC profile;

transmitting, to the SM-DS, an event registration request message for an event related to the second eUICC profile to be installed in the second terminal, the event registration request message indicating that the event related to the second eUICC profile is not forwardable; and receiving, from the SM-DS, an event registration response message in response to the event registration request message, the event registration response message comprising information indicating that the event related to the second eUICC profile is not forwardable to the second terminal, wherein the event related to the second eUICC profile is indicated as forwardable, based on identification of a deletion of the first eUICC profile from the first terminal.

6. The method of claim 5, further comprising:

transmitting, to the first terminal, a transfer request result comprising information for downloading the second eUICC profile, the information for downloading the second eUICC profile comprising at least one of an activation code, a profile deletion indicator, and an event registration indicator, which correspond to the second eUICC profile; and receiving, from the first terminal, a notification confirming the deletion of the first eUICC profile.

7. The method of claim 6, further comprising:

transmitting, to the SM-DS, an event forwarding request message for requesting to configure the event as forwardable, in case that the deletion of the first eUICC profile is identified by the first terminal;

receiving, from the SM-DS, an event forwarding response message for confirming the event being configured as forwardable;

transmitting, to the first terminal, a first eUICC profile deletion verification result;

receiving, from the second terminal, a download request message for downloading of the second eUICC profile; and transmitting, to the second terminal, the second eUICC profile.

8. A subscription manager discovery service (SM-DS) in a wireless communication system for transferring a first embedded universal integrated circuit card (eUICC) profile of a first terminal to a second terminal, the SM-DS comprising:

a transceiver;

memory, comprising one or more storage media, storing instructions; and at least one processor communicatively coupled to the transceiver and the memory, wherein the instructions, when executed by the one or more processors individually or collectively, cause the SM-DS to:

receive, from a subscription manager data preparation plus (SM-DP+) through the transceiver, an event registration request message for an event related to a second eUICC profile to be installed in the second terminal, the event registration request message indicating that the event related to the second eUICC profile is not forwardable, and the second eUICC profile corresponding to the first eUICC profile installed in the first terminal, and transmit, to the SM-DP+ through the transceiver, an event registration response message in response to the event registration request message, the event registration response message comprising information indicating that the event related to the second eUICC profile is not forwardable to the second terminal, and wherein the event related to the second eUICC profile is indicated as forwardable, based on identification of a deletion of the first eUICC profile from the first terminal.

9. The SM-DS of claim 8, wherein the event registration request message comprises at least one of:

an event identifier of the second eUICC profile prepared by the SM-DP+, and an event forwarding indicator indicating that the event is to be registered by the SM-DS as not forwardable.

10. The SM-DS of claim 8, wherein the instructions that, when executed by the at least one processor individually or collectively, further cause the SM-DS to:

receive, from the SM-DP+ through the transceiver, an event forwarding request message for requesting to configure the event as forwardable, in case that deletion of the first eUICC profile by the first terminal is identified by the SM-DP+, configure the event as forwardable, based on the event forwarding request message, and transmit, to the SM-DP+ through the transceiver, an event forwarding response message for confirming the event being configured as forwardable.

11. The SM-DS of claim 10, wherein the instructions that, when executed by the at least one processor individually or collectively, further cause the SM-DS to:

in case that an activation code is transferred from the first terminal to the second terminal, transmit, to the SM-DP+ through the transceiver, a notification message notifying that the event related to the second eUICC profile has been registered, receive, from the second terminal through the transceiver, a message for requesting forwarding of the event, and transmit, to the second terminal through the transceiver, an event list comprising information for downloading the second eUICC profile.

12. A subscription manager data preparation plus (SM-DP+) for providing an embedded universal integrated circuit card (eUICC) profile in a wireless communication system, the SM-DP+ comprising:

a transceiver;

memory, comprising one or more storage media, storing instructions; and at least one processor communicatively coupled to the transceiver and the memory, wherein the instructions, when executed by the one or more processors individually or collectively, cause the SM-DP+ to:

receive, from a first terminal through the transceiver, a transfer request message for requesting transfer of a first eUICC profile installed in the first terminal to a second terminal, the transfer request message comprising at least one of an eUICC identifier installed in the second terminal, a type allocation code (TAC) of the second terminal, information on a subscription manager discovery service (SM-DS) supported by the second terminal, and an indicator indicating whether the SM-DS supported by the second terminal supports a push notification, prepare a second eUICC profile for transfer to the second terminal, the second eUICC profile corresponding to the first eUICC profile, transmit, to the SM-DS through the transceiver, an event registration request message for an event related to the second eUICC profile to be installed in the second terminal, the event registration request message indicating that the event related to the second eUICC profile is not forwardable, and receive, from the SM-DS through the transceiver, an event registration response message in response to the event registration request message, the event registration response message comprising information indicating that the event related to the second eUICC profile is not forwardable to the second terminal, and wherein the event related to the second eUICC profile is indicated as forwardable, based on identification of a deletion of the first eUICC profile from the first terminal.

13. The SM-DP+ of claim 12, wherein the instructions that, when executed by the at least one processor individually or collectively, further cause the SM-DP+ to:

transmit, to the first terminal through the transceiver, a transfer request result comprising information for downloading the second eUICC profile, the information for downloading the second eUICC profile comprising at least one of an activation code, a profile deletion indicator, and an event registration indicator, which correspond to the second eUICC profile, and receive, from the first terminal through the transceiver, a notification confirming the deletion of the first eUICC profile.

14. The SM-DP+ of claim 13, wherein the instructions that, when executed by the at least one processor individually or collectively, further cause the SM-DP+ to:

transmit, to the SM-DS through the transceiver, an event forwarding request message for requesting to configure the event as forwardable, in case that the deletion of the first eUICC profile by the first terminal is identified, receive, from the SM-DS through the transceiver, an event forwarding response message for confirming the event being configured as forwardable, transmit, to the first terminal through the transceiver, a first eUICC profile deletion verification result, receive, from the second terminal through the transceiver, a download request message for downloading of the second eUICC profile, and transmit, to the second terminal through the transceiver, the second eUICC profile.

* * * * *